(12) United States Patent
Specht et al.

(10) Patent No.: US 10,417,205 B2
(45) Date of Patent: Sep. 17, 2019

(54) DATABASE SYSTEM AND METHOD OF OPERATION THEREOF

(71) Applicant: SAP SE, Walldorf (DE)

(72) Inventors: Juergen Specht, Gerabronn-Anlishggen (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 576 days.

(21) Appl. No.: 15/175,058

(22) Filed: Jun. 7, 2016

(65) Prior Publication Data

US 2017/0351442 A1 Dec. 7, 2017

(51) Int. Cl.
*G06F 16/00* (2019.01)
*G06F 16/22* (2019.01)
*G06F 11/34* (2006.01)
*G06F 12/02* (2006.01)

(52) U.S. Cl.
CPC .............. *G06F 16/22* (2019.01); *G06F 11/34* (2013.01); *G06F 12/0284* (2013.01); *G06F 2212/401* (2013.01); *G06F 2212/502* (2013.01)

(58) Field of Classification Search
CPC ...... G06F 3/0644; G06F 3/0665; G06F 3/065; G06F 3/067; G06F 2212/401; G06F 3/0619; G06F 16/22; G06F 11/34; G06F 2212/502; G06F 12/0284
See application file for complete search history.

(56) References Cited

U.S. PATENT DOCUMENTS

| | | | |
|---|---|---|---|
| 9,600,526 B2 * | 3/2017 | Johnson | G06F 17/30501 |
| 2007/0239797 A1 * | 10/2007 | Cattell | G06F 17/30306 |
| 2013/0159248 A1 * | 6/2013 | Mueller | G06F 17/30 707/609 |
| 2015/0199147 A1 * | 7/2015 | Goldberg | G06F 3/0644 711/170 |
| 2016/0224264 A1 * | 8/2016 | Chambliss | G06F 11/1435 |
| 2016/0357479 A1 * | 12/2016 | Koarashi | G06F 3/0644 |

FOREIGN PATENT DOCUMENTS

EP 3026583 A1 6/2016

OTHER PUBLICATIONS

Search Report for European Application No. 16173345.6 dated Oct. 14, 2016.
Sandor Heman et al., "Positional update handling in column stores," Proceedings of the 2010 International Conference on Management of Data, Sigmod, ACM Press, New York, New York, Jun. 6, 2010, pp. 543-554, XP058087494.

(Continued)

*Primary Examiner* — Leslie Wong
(74) *Attorney, Agent, or Firm* — Harness, Dickey & Pierce, P.L.C.

(57) ABSTRACT

A system includes a first and a second storage device and a computing device. A set of partitions includes a first subset of partitions and a second subset of partitions. The first storage device stores the first subset of partitions. The second storage device stores the second subset of partitions. The computing device is configured to execute an iterative update of a selected partition until a fully updated partition is generated. The updated partition generated in a current iteration is used as a selected partition in the next iteration, and a not yet updated partition is updated in every next following iteration.

20 Claims, 6 Drawing Sheets

(56) References Cited

OTHER PUBLICATIONS

Manos Athanassoulis et al., "MaSM," Proceedings of the 2011 ACM Sigmod International Conference on Management of Data, Jun. 12-16, 2011, Athens, Greece, ACM, New York, New York, Jun. 12, 2011, pp. 865-876, XP058003188.
Examination Report for corresponding European Application No. 16173345.6 dated Oct. 25, 2018.

* cited by examiner

DATABASE SYSTEM AND METHOD OF OPERATION THEREOF

BACKGROUND

Field

This disclosure relates generally to data processing and, in particular, to updating of database data.

Description of the Related Art

Create, read, update, and delete are the most frequently used database operations. Execution of these operations, especially of the update operation when executed batch-wise, requires a lot of computer resources for big databases using compression of data. In this case updating requires decompression of database data, updating of the decompressed data, and compressing of the updated data. Every step of this sequence requires computing power and a memory volume for storing of the intermediate results of this sequence. While a limitation in the computing power results as usual in a long duration of the update operation, a limitation in memory volume can result in a failure of the update operation. Deficiency in the memory volume to be used for the execution of the update operation may occur in the process of the execution of the update procedure. As a result thereof execution of the update operation can be aborted.

BRIEF SUMMARY

It is an objective of embodiments of the invention to provide for a database system configured to update partitions of database stored in the database system and a method of controlling such a database system. Advantageous embodiments are described in the dependent claims.

According to one embodiment, the present invention relates to a system comprising a first and a second storage device and a computing device, wherein a database is stored across a set of partitions comprising a first subset of partitions and a second subset of partitions, the first storage device stores the first subset of partitions, the second storage device stores the second subset of partitions, the computing device comprising a memory storing processor-executable program code and a computer processor to execute the processor-executable program code in order to cause the computing device to: receiving an update request to update a third subset of partitions of the set of partitions, selecting one of the partitions of the third subset of the partitions; writing the selected partition to the first storage device if the selected partition is stored only on the second storage device; evaluating available memory volume on the first storage device, the available memory volume being available for updating of the third subset of the partitions to be updated; and executing iterative update of the selected partition, the iterative update of the selected partition comprising: generating an updated portion of the selected partition on the first storage device by updating a portion of the selected partition according to the update request, wherein a data volume of the updated portion is less than the available memory volume, generating an updated partition on the first storage device by merging the updated portion of the selected partition with the selected partition, and writing a copy of the updated partition to the second storage device, wherein executing of the iterative update of the selected partition is continued until a fully updated partition is generated, wherein the updated partition generated in the current iteration is used as the selected partition in the next iteration, wherein a not yet updated portion of the selected partition is updated in every next following iteration.

According to another embodiment, the present invention relates to a computer-implemented method for updating a database stored across a set of partitions on a computer system. The computer system comprises a first and a second storage device and a computing device. The set of partitions comprises a first subset of partitions and a second subset of partitions. The first storage device stores the first subset of partitions. The second storage device stores the second subset of partitions. The computing device comprises a memory storing processor-executable program code and a computer processor to execute the processor-executable program code in order to cause the computing device to execute the computer-implemented method. The computer-implemented method comprises the following: receiving an update request to update a third subset of partitions of the set of partitions; selecting one of the partitions of the third subset of the partitions; writing the selected partition to the first storage device if the selected partition is stored only on the second storage device; evaluating available memory volume on the first storage device, the available memory volume being available for updating of the third subset of the partitions to be updated; and executing iterative update of the selected partition. The iterative update of the selected partition comprises the following: generating an updated portion of the selected partition on the first storage device by updating a portion of the selected partition according to the update request, wherein a data volume of the updated portion is less than the available memory volume, generating an updated partition on the first storage device by merging the updated portion of the selected partition with the selected partition, and writing a copy of the updated partition to the second storage device. Executing of the iterative update of the selected partition is continued until a fully updated partition is generated. The updated partition generated in the current iteration is used as the selected partition in the next iteration, wherein a not yet updated portion of the selected partition is updated in every next following iteration.

According to another embodiment, the present invention relates to a computer readable medium having stored thereon a computer executable code for execution by a microprocessor controlling an electronic system, wherein execution of the executable code causes the electronic system to execute a computer-implemented method of the aforementioned embodiment.

These embodiments can be advantageous, because they can provide for optimum memory utilization in the process of partition updating.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
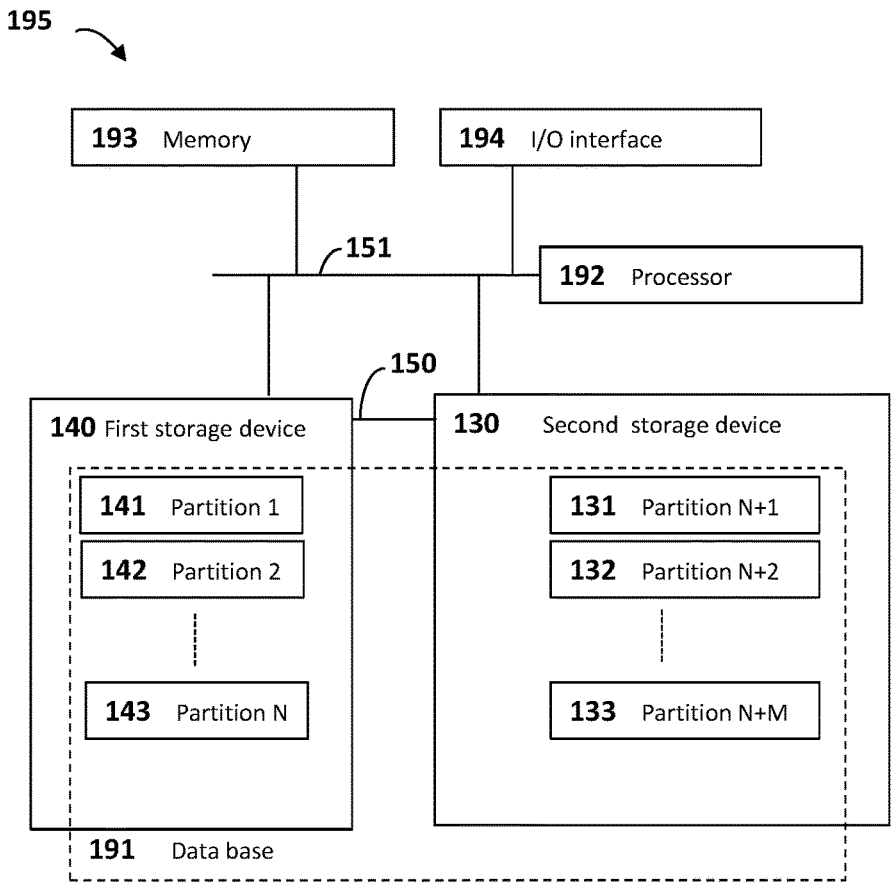
FIG. 1 is a block diagram of a system.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

According to another embodiment, the portions of the selected partition in a process of the executing of the iterative update of the selected partition are selected such that a number of iterations in the process of the executing of the iterative update of the selected partition is minimized.

This embodiment can be advantageous because it can provide for data traffic minimization between the first and the second storage device.

According to another embodiment at least one of the iterations in a process of the execution of the iterative update of the selected partition comprises: updating the available memory volume.

This embodiment can be advantageous because it can provide for effective memory utilization, because the available memory volume can change due to execution of other processes in parallel with a process of updating of the selected partition.

According to another embodiment in a process of the generating of the updated portion of the selected partition on the first storage device by updating the portion of the selected partition according to the update request the updated portion of the selected partition is generated gradually until the data volume of the updated portion exceeds a predefined percentage of the available memory volume. In the process of the gradual generation of the updated portion of the selected partition a data volume of data comprised in an original form in the selected partition and in an updated form in the updated portion of the selected partition increases.

This embodiment can be advantageous because it can enable interactive utilization of memory which is based on the currently available memory volume for updating of the partitions.

According to another embodiment, the predefined percentage is determined such that that a number of iterations in the process of the executing of the iterative update of the selected partition is minimized.

This embodiment can be advantageous because it can provide for an effective utilization of the memory of the first storage device and/or decrease in data traffic between the first and the second storage device.

According to another embodiment the selected partition has the biggest data volume among the partitions of the third subset of partitions.

This embodiment can be advantageous, because it can provide for an optimum sequence of updating of the partitions.

According to another embodiment, the generating of an updated partition on the first storage device by merging the updated portion of the selected partition with the selected partition comprises substituting a portion of the partition corresponding to the updated portion with the updated portion.

This embodiment can be advantageous, because it can provide for an effective merge procedure.

According to another embodiment, the database is a column store database storing columns of stables stored in the database as contiguous data records, wherein the generating of the updated portion of the selected partition on the first storage device by updating a portion of the selected partition according to the update request comprises generating, according to the update request, updated rows of one or more tables stored in the database.

This embodiment can be advantageous, because it can provides for an effective update procedure. The gradual generation of the updated portion of the selected partition can be executed on row by row basis.

According to another embodiment the execution of the processor-executable code by the computer processor further causes the computing device to: selecting another partition of the third subset of the partitions if the third subset of partitions comprises at least one not yet selected partition and a process of the executing of the iterative update of the another partition can be started in parallel with a process of executing of the iterative update of the selected partition and be completed using a portion of the available memory volume in a number of iterations being less than a predefined positive number divided by a data volume used for storing of the another partition on either the first or the second storage device, wherein the portion of the available memory is equal to the available memory volume minus a sum of all summands of a set of summands, the set of summands comprising a data volume of the another selected partition if it is stored only on the second storage and a memory volume used for the executing of iterative update of the selected partition; and performing the following if the another partition is selected: writing the another selected partition to the first storage device if the another selected partition is stored only on the second storage device; executing the iterative update of the another selected partition, wherein a data volume of the updated portion of the another selected partition in any of the iterations in a process of the executing of the iterative update of the another selected partition is less than the portion of the available memory volume; and moving the fully updated another selected partition from the first storage device to the second storage device if the writing of the another selected partition to the first storage device from the second storage device is executed.

This embodiment can be advantageous, because it can provide for an effective criterion for starting an updated of a partition in parallel with a process of updating of another partition. When the criterion is complied with the data traffic between the first and the second storage device can be kept below a predefined threshold value. In addition, this embodiment provides for an effective process of updating of several partitions in parallel. The algorithm of the process itself is the same for the partitions being updated in parallel, the only one difference between the processes of partitions being updated in parallel are the constants determining the memory utilization by these processes.

According to another embodiment a process of the executing of the iterative update of the selected partition is executed in a number of iterations being equal or less than a sum of two and an integer value of a ratio of a first and a second product, the first product being a product of all multiples of a set of multiples, the set of multiples comprising a data volume of the selected partition stored on the first storage device before the executing of the iterative update of the selected partition and a degree of data compression of the selected partition stored on the first storage device before the executing of the iterative update of the selected partition, the second product being a product of the evaluated memory volume and a degree of data compression of the updated portion of the selected partition.

This embodiment can be advantageous, because it can provide for an effective determination of the number of iterations needed for the updating of the selected partition such that a situation wherein an out of memory error is generated is avoided.

According to another embodiment, the set of multiples comprising a data update factor being a ratio of a data volume of the fully updated selected partition stored on the first storage device and a data volume of the selected partition stored on the first storage device before the executing of the iterative update of the selected partition.

This embodiment can be advantageous, because it can provide for an improved equation for determination of the number of the iterations according to the aforementioned embodiment.

According to another embodiment the first storage device has a shorter access time than the second storage device.

This embodiment can be advantageous, because it can provide for effective hardware architecture. Frequently used data can be stored on the first storage device, while other data can be stored on the second storage device.

According to another embodiment the system comprises dynamic random access memory, DRAM, wherein the first storage device comprises a portion of the DRAM and is configured to store the first subset of partitions in the portion of the DRAM.

According to another embodiment, the execution of the processor-executable code by the computer processor further causes the computing device to: selecting yet another partition of the third subset of the partitions if the third subset of the partitions comprises at least one not yet selected partition and all other executions of iterative update of all previously selected partitions are completed, wherein the yet another partition has the biggest data volume among all of the not yet selected partitions of the third subset of the partitions; and executing the iterative update of the yet another selected partition if the yet another partition is selected.

This embodiment can be advantageous, because it can provide for an optimum sequence in which the partitions can be updated.

In another embodiment, a data volume of the selected partition is excluded from the available memory volume if the writing of the selected partition to the first storage device is executed.

This embodiment can be advantageous, because it can provide for more accurate determination of the memory volume being available for the updating of the partitions of the third subset.

In another embodiment, the execution of the processor-executable code by the computer processor further causes the computing device to: moving the fully updated partition from the first storage to the second storage if the writing of the selected partition to the first data storage is executed.

This embodiment can be advantageous, because it can provide for an effective utilization of the memory volume of the first storage device.

In another embodiment, a degree of data compression of the updated portion of the selected partition on the first storage device is less than a degree of data compression of the selected partition on the first storage device.

This embodiment can be advantageous, because it can provide for an accelerated generation of the updated portion of the selected partition.

FIG. 1 illustrates a an exemplary computer system 195 that can provide an access to a data base 191 stored across a set of partitions "Partition 0"–"Partition N+M" 131-133, 141-143. The system comprises a first storage device 140 and a second storage device 130. A first subset of partitions (partitions from 1 to N) are stored on the first storage device 140. A second subset of partitions (partitions from N+1 to N+M) are stored on the second storage device 130. N and M are positive integer numbers. Alternatively, some of the partitions of the database of can be stored on other storage devices not depicted on FIG. 1. The first storage device 140 can have a shorter data access/processing time than the second storage device 130. The first storage device may be implemented using Dynamic Random Access Memory (DRAM) and/or Static Random Access Memory (SRAM), while the second storage device may be implemented using one or more Hard Disk Drives (HDD) and/or one or more Solid State Drives (SSD). When the first and the second storage device are implemented as described above, then the first storage device comprises as usual only a few of the partitions, because of the cost limiting factors determining that the first storage device is smaller than the second storage device. In this case storing one or more partitions containing the most frequently used data on the first storage device results in acceleration of access to the data of the database stored on the first storage device. The partitions (or the single partition) stored on the first storage device can be implemented as in-memory database. The second storage device can be used for storing of old versions of the one or more partitions stored on the first storage device. The second storage device can be used for storage of back-up copies of actual (up to date) current versions of one or more partitions stored on the first storage device. The partitions stored on the first and the second storage device can be stored using data compression. The partitions stored on the first storage device and the partitions stored on the second storage device can have the same data compression, or for instance the partitions stored on the second storage device can have higher data compression than the partitions stored on the first storage device.

The database system 195 can further comprise a computing device comprising a memory 193 and a computer processor 192 (or a cluster of computer processors 192) controlling the database system 195. In addition, the computing system can comprise an input-output interface (e.g. user terminal or/and an interface for connecting the database system to other computer systems), and a computing unit (e.g. computer processor or a cluster of computer processors).

The memory 193 can store a computer-executable code, which when executed by the computer processor causes the database system to receive instructions to execute operations (e.g. update operations) on data stored in the database (partitions). The instructions can be received via the input-output interface 194. The computer executable-code, when executed by computer processor 192, can cause the database system 195 to execute the received instructions. The memory 193, the input-output interface 194, the processor (cluster) 192, the first 140 and the second 130 storage device can be communicatively coupled by a data bus 151. In addition or as alternative the first 140 and the second 130 storage device can be communicatively coupled by another data bus 150. The computer-executable can support execution of several processes on the computer system 195. Each of partitions being updated in parallel can be updated, each, using a dedicated process. The computer-executable code can support further processes, which are not related to updating of partitions. The aforementioned processes can use the first storage device for storing of the data related to the execution of the processes.

Partitions can store any types of data in various ways. One or more partitions can store, each, data entities of different types. One or more partitions can store a respective table each. Another one or more partitions can store several tables. One of the tables can be stored across several partitions. Yet another one or more partitions can store Binary Large OBjects (BLOBs) which can be for instance audio files, video files, and/or other multimedia files.

For the same reasons as mentioned above, operations on partitions such as updating of data stored therein can be executed using the first storage device. When partition is stored on the second storage device, it can be uploaded to the first storage device for execution of the update operation. The updating of the partition results in a generation of the updated partition according to update instructions. For instance one of the updating instruction can be an instruction to fix a famous "millennium bug" problem, which can be fixed by extending storage space for dates comprising year numbers. In order to speed-up the generation of the updated partition, the updated partition or at least a portion of the updated partition stored on the first storage device can have lower degree of data compression in comparison with a degree of data compression of the partition to be updated. The updated partition can be generated step-by-step, wherein data entities of the partition to be updated are generated on the first storage device one after each other. For instance, when the partition is a table, the updated partition can be generated row-by-row. Alternatively, the partition or a portion thereof can be uploaded/generated on the first storage device, afterwards it can be corrected. For instance, this approach can be effective when only the "millennium bug" has to be fixed. In this case, when the partition consists of one table, then only the columns having cells comprising the numbers of years have to be corrected and the correction is practically the same for each of the cells having the year number. In contrast, step-by-step approach might be more productive for complex update procedures, in particular when the update of one of the data entities of the partition provides information for updating of the next data entity of the partition. The latter approach can be advantageous, when update operation has to be executed for updating of (foreign) key relationships of the partition.

Since the data volume of the first storage device can be limited, the partition to be updated can be split in portions and for each of the portions its respective portion can be updated separately. When the updating of the partition is executed in this way, the memory volume on the first storage device needed for execution of the update of the entire partition can be reduced. The updated portions of the partition can be executed one after each other. After each updated portion of the partition is generated it can be merged with the partition to be updated, e.g. by substituting the corresponding portion of the partition to be updated in said partition. In this case the memory space of the first storage device is only used for the generation of the update for the portion of the partition which is currently being updated. Although approach enables effective utilization of the memory space of the first storage device, another factor has to be taken into account, when after each merge operation a back-up copy of the partition to be updated is stored on the second storage device. When partition to be updated is split in very little portions to be updated in each of the iterations, the data bus providing communicative coupling between the first and the second storage is heavily loaded. Thus, there is a need to develop a method and a system, which address these contradictory requirements, i.e. minimization of a data exchange load between the first and the second storage device and minimization of a load of the memory space of the first storage device.

Figure 2:
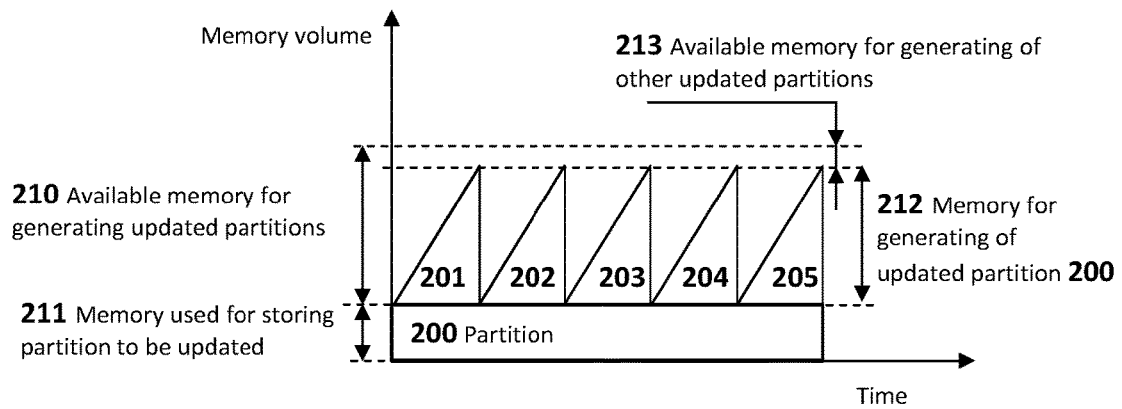
FIG. 2 is a time diagram of memory utilization in a process of updating of a partition.

FIGS. 2-6 illustrate examples of this problem and approach for its solution. FIG. 2 illustrates memory utilization versus time in a process of update of a partition 200 stored on the first data storage. The memory volume of the first storage device 140 comprises two portions, one portion 210 is available for generating of updated portions of partition 200. Another portion 211 is used for storing the partition 200 to be updated. The partition 200 is updated in 5 iterations 201-205. In each of the iterations, the respective updated portion of the partition 200 is generated. The memory volume used in each of the iterations monotonically increases in time because data items of the updated portion of the partition are generated gradually. For instance, when the partition 200 comprises one or more tables, then the generation of the updated portion of the partition 200 in each of the iterations is executed on row-by-row basis. When each of the iterations is completed, the generated updated portion of the partition is merged with the partition 200 and after the merging of the updated portion of the partition 200 with the partition 200 a back-up copy of the partition 200 is stored on the second storage device 130. As a result thereof the partition 200 is copied to the second data storage 130 5 times. In this example, the partition 200 is split in five portions, wherein each of the portions is updated in the respective iteration. The memory volume 210 available for the generation of the update of the partition 200 is not fully used, because the partition to be updated is spit in (substantially) equal portions, wherein each of the portions is updated in a respective iteration. One portion of it 212 is used for the generation of the update of the partition 200, while another portion of it 213 is not used. The degree of data compression of the generated update portions of the partition is lower than a degree of data compression of the partition 200. As a result thereof the memory volume used for the generation of the updated portions 212 is less than the memory volume 210 used for storing of the partition 200. The portion 213 can be used for generating updates of other partitions. The portion 213 is too small to reduce the number of iteration. Thus, maximum utilization of the memory volume 210 available for the generation of updated portions of the partition 200 is achieved. The difference of data volume of the updated partition after each of the iterations is considered negligible. The difference of data volumes of the generated updated portions of the partition 200 is considered negligible as well.

In the aforementioned example and in any of the next following examples in each of the iterations the partition being updated is doubled on the first storage device in the process of executing of the merge operation, A back-up copy of the partition to be merged with the updated portion of it can be generated on the first storage device before starting the merge. After completing of the merge operation, the back-up copy of the partition on the first storage device is deleted. When the doubling of the partition in the merge operation is performed, then the copy of the partition being updated can be generated in the memory volume 210 available for generating updated partitions.

Figure 3:
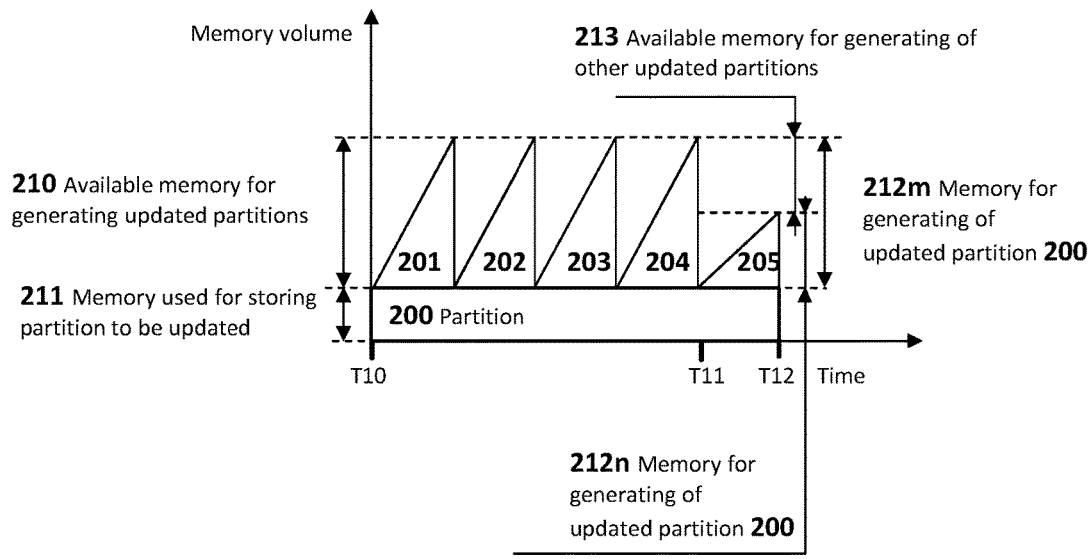
FIG. 3 is a time diagram of memory utilization in a process of updating of a partition.

FIG. 3 is another example of a process of updating of the partition 200. The partition 200 is updated in the same number of iterations 201-205 (5 iterations) as on FIG. 2. However, the partition 200 in the process depicted on FIG. 2 is spit in portions being updated in respective iterations such that the available memory for generating updated partitions 210 is fully used in all iterations except the last one, i.e. in the time interval T10-T11 the memory volume 210 is fully used (memory volume 212m is the same as the memory volume 213) and updating of any other partition is not possible. However in the last iteration 205 (time interval T11-T12), the memory volume available for updating other partitions 213 is substantially bigger than the memory volume 213 available for updating of other partitions in the process illustrated on FIG. 2, because the memory volume used for updating.

Those skilled in the art will readily understand that the processes depicted on FIGS. 2 and 3 represent two outmost cases, which are executed in the same number of iterations. Any intermediate situation can be implemented, wherein the memory volume 213 available for updating of other partitions in the time interval T11-T12 can be split in any portions in the iterations 201-205. For instance, the memory volume 213 in the time interval T11-T12 can be split in two portions, which can be made available for updating of other partitions in iterations 203 and 204. In this case, in the latter iteration 205 the memory volume 213 is fully used by the process of updating of the partition 200.

Figure 4:
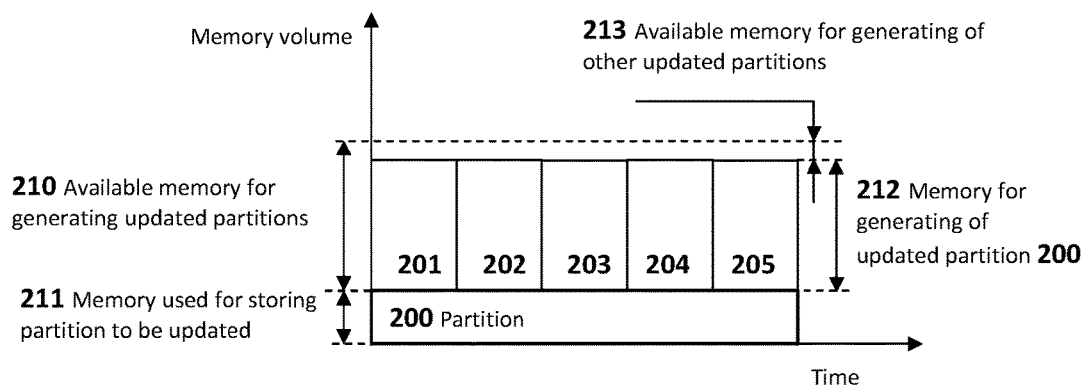
FIG. 4 is a time diagram of memory utilization in a process of updating of a partition.

FIG. 4 illustrates memory utilization versus time in a process of update of the same partition 200 stored on the first data storage. The memory volume 210 available for the generation of the updated portion of the partition 200 is the same as well. In contrast to the update of the partition depicted on FIGS. 2 and 3, portions of the partition 200 to be updated are generated in a different way. The portion to be updated in the current iteration 201-205 is duplicated in the memory 210 available for the generating of the updated partitions. Afterwards the duplicated portions are updated. The updated portions are merged with the partition 200 and a back-up copy of the updated partition 200 is stored on the second storage device as in the aforementioned examples of FIGS. 2 and 3. Similar to the examples of FIGS. 2 and 3, the difference of data volume of the updated partition after each of the iterations is considered negligible and the difference of data volumes of the generated updated portions of the partition 200 is considered negligible as well. Optimum utilization of the memory volume 210 available for the generation of the updated partitions is achieved as well.

Figure 5:
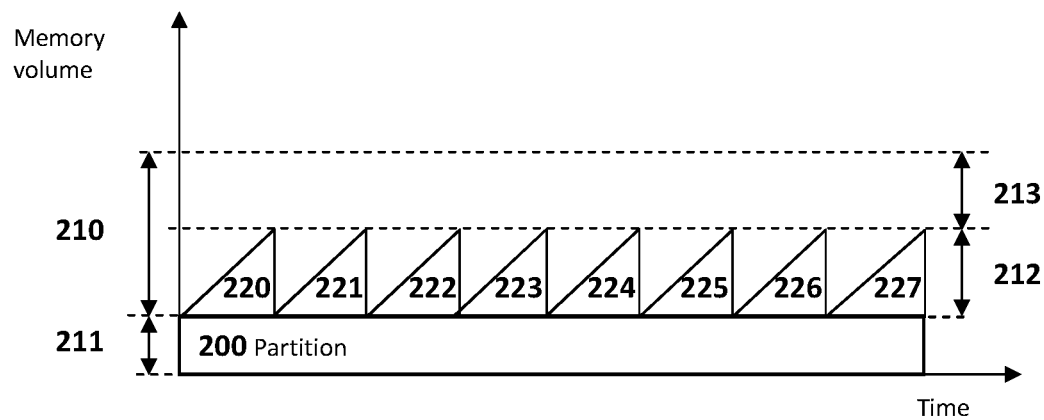
FIG. 5 is a time diagram of memory utilization in a process of updating of partition.

FIG. 5 illustrates memory utilization versus time in a process of update of the same partition 200 stored on the first data storage. In contrast to examples depicted on FIGS. 2-4, the process of the update of the partition 200 does not achieve optimum utilization of the memory volume 210 available for generation of updated partitions. The updated partition 200 is generated in 8 iterations 220-227. As a result thereof the memory volume 213 left for updating of the other partitions on FIG. 5 is much bigger than the memory volume 213 left for updating of the other partitions on FIGS. 2 and 4. The process of updating of the partition 200 in the process depicted on FIG. 5 requires 8 operations of storing of the back-up copies of the partition 200 on the second storage device 130, while the process of updating of the partition 200 in the process depicted on FIGS. 2-4 requires only 5 operations of storing of the back-up copies of the partition 200 on the second storage device 130. Thus in contrast to the process depicted on FIG. 5, the processes depicted on FIGS. 2-4 enable maximum possible utilization of the available memory for the generation of the updated partitions and at the same time minimum possible data traffic between the first 140 and the second storage devices (i.e. a number of operations of storing of the back-up copies of the partition 200 on the second storage device 130).

Figure 6:
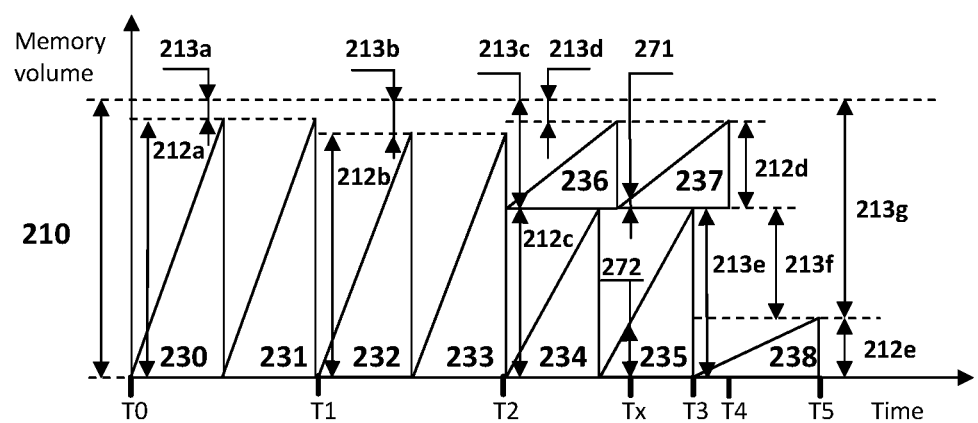
FIG. 6 is a time diagram of memory utilization in a process of updating of partitions.

FIG. 6 illustrates another example of updating of 5 partitions. The changes of the memory volume 210 available for generation of the updated partitions due to changes of data volumes of the partitions to be updated are neglected. The changes of the memory volume due to possible uploading on the first storage device 140 of one or more partitions to be updated in case they are initially stored on the second storage device 130 are omitted for illustrative purposes. Changes in the memory volume 210 due to the aforementioned processes can be monitored in the process of the generation of the updates of the partitions to be updated after each (or at least some) of the iterations and a data volume of the next portion of the partition to be updated can be increased or decreased in order to provide optimum utilization of the memory volume 210. The first partition updated in the process depicted on FIG. 5 is updated in two iterations 230 and 231 in a way as described above. Memory volume 212a used for the generation of the update of the first partition is very close to the memory volume 210 available for the generation of the updated partitions 210. The remaining memory volume 213a for the generation of the updates of other partitions is too small for generation of update of another partition because its execution using the memory volume 213a requires big number of iterations, i.e. heavy load of data traffic between the first 140 and the second 130 storage device.

After execution of the update of the first partition in time interval T0-T1 a process of updating of a second partition is started. It is performed in two iterations 232 and 233 in a way as described above. The memory volume 212b used in this process is again too big to justify starting of a process of updating of another partition, because the remaining data volume 213b is too small to enable updating of the another partition in a small number of iterations.

After execution of the update of the second partition in time interval T1-T2 a process of updating of a third partition is stated. It is performed in two iterations 234 and 235 in a way as described above. The memory volume 212c used in this process is big enough to justify starting of a process of updating of another partition, because the remaining data volume 213c is big enough to enable updating of the another partition in a small number of iterations. A process of updating of a fourth partition is started in parallel with the process of updating of the third partition. It is executed in two iterations 236 and 237 in a way as described above using a memory volume 212d. The remaining available memory volume 213d after the updating of the third and the fourth partition is started is too small to enable updating of another partition in a small number of iterations.

The utilization of memory for each of the iterations executed in parallel is depicted separately on FIG. 6 for illustrative purposes, e.g. memory volumes used in iterations 237 and 235 being executed in parallel are depicted separately. The overall memory used in the processes of updating of the third and the fourth partitions at time Tx is equal to a sum of a memory volume 271 used in the iteration 237 at time Tx and a memory volume 272 used in the iteration 235 at time Tx.

After execution of the update of the third partition in time interval T2-T3 an evaluation of available memory volume for updating of another partition is performed. At the moment of time T3 it is equal to a sum of the memory volumes 213e and 213d. It is big enough to execute a process of updating of a fifth partition in one iteration 238 in a way as described above using a memory volume 212e. At the moment of time T4, when the updating of the fourth partition is completed, a memory volume available for updating of other partitions in parallel with a process of updating of the fifth partition can be updated. In this example it is equal to a memory volume 213g.

The following equation [1] can be used for determining a number of iterations to be used for updating of a partition:

$$N = \text{int}\left(\frac{\text{Max}(P, P*k3)*k1}{((M - \text{Max}(P, P*k3))*k2}\right) + m,$$

wherein N is a number of iterations, "int" is a function of calculation of an integer value, "*" is a symbol of the multiplication operation, "Max" is function of selecting of a maximum value, P is a data volume on the first storage device used for storing of the partition in a compressed state before updating, k1 is a degree of data compression of the partition stored on the first data storage, k3 is a coefficient of data volume change of the partition after executing of update process of the partition, M is a memory volume on the first storage device 140 available for updating of partitions after uploading to the first storage device of a partition to be updated if it is stored only on the first storage device before updating, k2 is a degree of data compression of a generated updated portion of the partition on the first storage device 140, m is an positive integer number. k1 is equal to a data volume of an uncompressed partition divided by a data volume used on the first storage for storing of the partition in a compressed state (P). k2 is equal to a data volume of an uncompressed updated portion of the partition divided by a data volume used on the first storage 140 for storing of the updated portion of the partition in a compressed state. k3 is equal to a data volume of a fully updated partition stored on the first data storage divided by a data volume of the same partition stored on the first data storage before its update. Subtracting of the term Max(P, P*k3) from the available memory volume M is optional. It is needed for instance, when execution of the merging operation requires doubling of the partition being updated on the first storage device. This can be advantageous, because in this case the failure of the merge operation does not cause data loss.

It is necessary to mention, when the partition to be updated is uploaded from the second 141 to the first 140 storage device, the memory volume (M) available for generating of updating of partitions can be used for this purpose. When this this the case the memory volume M has to be reduced accordingly, i.e. a data volume of the partition uploaded to the first storage device 140 has to be subtracted from the memory volume M. Alternatively, the memory volume M can be evaluated after uploading of the partition to be updated.

The coefficients k1, k2, and k3 can be determined empirically or average values of these coefficients can be used. Although exact values of these coefficients are different from iteration to iteration and from partition to partition, a failure, when the generated updated portion of a partition exceeds the memory volume available for the generation of the updated partitions, can be avoided by selecting a value of m. In case when the coefficients k1, k2, and k3 are determined before the updating of the partition m can be set to unity. In case when only estimate coefficients k1, k2, and k3 are known before the updating of the partition m can be set to 2 or even bigger value. The latter option provides for a conservative approach, which can guarantee that said failure does not occur. The values of k1, k2, k3 can be measured independently in processes of updating of partitions. The collected data can be used for determining average values of these coefficients. Moreover, the average values of these coefficients can be determined for different types of data stored in partitions and/or different types of partitions. After collecting of sufficient number of statistics, the accurate values of these coefficients can be determined. As a result thereof, the value of m can be reduced.

In some applications, a simplified version of the aforementioned equation can be used, wherein coefficient k3 is omitted (i.e. set to unity).

The same equation can be used for determining of a number of iterations needed for updating of a partition in parallel with one or more process of updating of one or more other partitions. In this case, a portion of the memory volume available for updating of the partition (e.g. the fourth partition in the aforementioned example) in parallel with one or more processes of updating of one or more other partitions (e.g. the third partition in the aforementioned example) is a portion of the overall memory volume (e.g. 210 on FIG. 5) available for updating of partitions which is not used for all other currently running processes of updating of partition(s) (e.g. 213c on FIG. 5). A memory volume used for a process of updating of a partition can measured directly in the process of the updating of the partition or it can be determined according to the following equation [2] using the parameters determined above:

$$P1 = \left(\frac{\text{Max}(P, P*k3)*k1}{N*k2}\right) + \text{Max}(P, P*k3).$$

A simplified version of this equation can be used for some applications, wherein k3 is omitted, i.e. set to unity. Addition of the term Max(P, P*k3) is optional for the same reasons as formulated above, when the same term is subtracted from the available memory volume.

Calculating, as described above, of a number of iterations needed for generation of the update of the partition in parallel with execution of updates of one or more other partitions can be used for evaluating a benchmark criterion enabling starting of a process of updating of said partition. Since one of the objectives of the method described herein is minimization of the data exchange between the first 140 and the second 130 storage device, the benchmark criterion can be formulated as follows: the updating of a partition can be started in parallel with update processes of one or more other partitions when a product of a data volume of said partition used for storage of said partition on the first storage device before updating and a number of iterations needed for updating of said partition is less than a predefined positive value. This criterion can be formulated in another mathematically equivalent form: the updating of a partition can be started in parallel with update processes of one or more other partitions when a number of iterations needed for updating of said partition is less than a predefined positive value divided by a data volume of said partition used for storage of said partition on the first storage device before updating. This criterion does not reflect in a direct way probable change in the data volume of the partition after its update (k3 coefficient in the aforementioned equations [1] and [2]). However this factor can be taken into account by selecting the predefined positive value in a conservative way, such that probable increase in the data volume is taken into account.

The aforementioned equations can be used for updating the memory management schedule (e. g. updating of the values calculated using equations [1] and [2]) not only as a consequence of updating the coefficients k1-k3, but as a result of changes in memory volume 210 available for updating of the partitions. For instance, the memory volume 210 can change when a process not related to the updating of the partitions has claimed or released additional memory on the first storage device. These equations can be used for computing said memory management when several partitions are being updated in parallel. In this case the memory on the first storage device can be released because a process of updating of a partition is completed. For instance, in the example depicted on FIG. 6 at the moment of time T3, the memory volume available for updating of not yet updated partitions is increased because the process of updating of the third partition is completed.

The equations [1] and [2] can be used for calculation of the respective parameters characterizing a process of updating a partition which can be started in parallel with an updating process of another partition. In this case the overall available memory volume for updating of partitions 210 can be used for calculation of values according to equations [1] and [2] for one of the another partition. Then a portion (M') of the free memory available for updating of said partition which can be started in parallel with the updating process of the another partition is calculated according to the equation [3]: M'=M−P1. The memory management for updating of the another partition is calculated using the equations [1] and [2] wherein M' is calculated according to equation [3] is used instead of M. This process can be repeated iteratively for any arbitrary number of the partitions to be updated in parallel.

Figure 7:
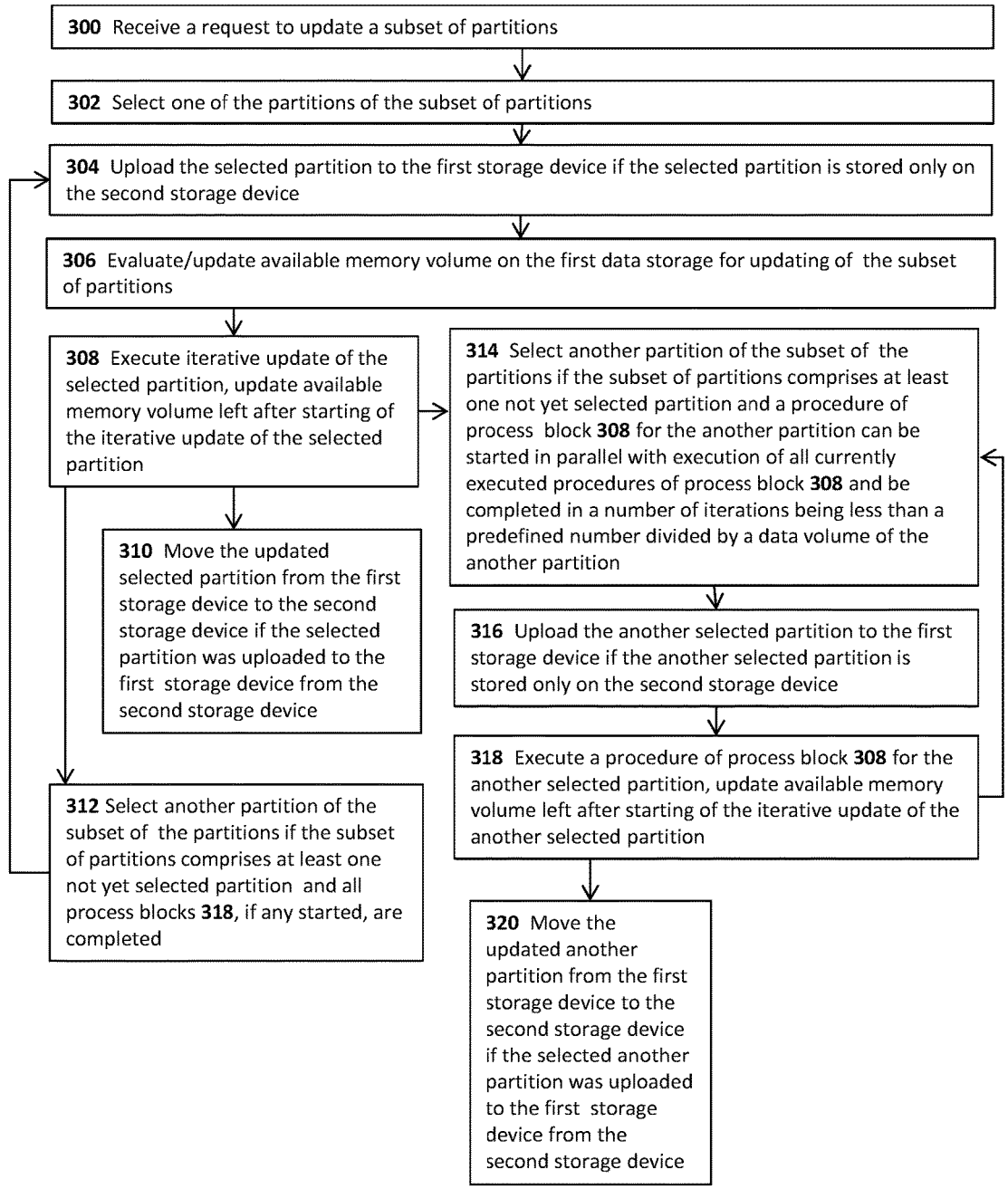
FIG. 7 is a flow chart of a method.

FIG. 7 illustrates a flow diagram of a method for updating of set of partitions. The set of partitions can be updated using the database system 195. The method is based on the aforementioned principles. The method begins with process block 300. In process block 300 a request to update a third subset of partitions is received. The request comprises a specification of the update of the third subset of partitions. Each of the partitions of the third subset is stored either on the first storage device or on the second storage device.

Process block 302 is executed after process block 300. In process block 302 one the partitions of the third subset is selected. The selected partition can have the biggest data volume among the not yet selected partitions of the third subset.

Process block 304 is executed after process block 302. In process block 304 the selected partition is uploaded to the first storage device if it is stored on the second storage device or it is uploaded to the second storage device if it is stored on the first storage device.

Process block 306 is executed after process block 304. In process block 306 an available memory volume on the first storage device is evaluated. The available memory volume can be a memory volume which is not used for storage of partitions on the first storage device and/or not used by other processes executed on the database system 195.

Process block 306 can be executed before any of the aforementioned process blocks. In this case, the memory volume available for the generation of updated partitions has to be updated before execution of process block 308. Said memory volume can be reduced as a consequence of uploading of the selected partition to the first storage device when this operation is executed. In addition, other processes on the database system 195 can be started, which execution can require memory of the first storage device.

Process block 308 is executed after process block 306. In process block 308 an iterative update of the partition selected in process block 302 is executed. For instance it can be the first partition in the example depicted on FIG. 5. Process block 308 can comprise an additional operation of evaluating of a portion of the available memory volume which can be used for updating of other partitions of the third subset. It can be done by subtracting from the memory volume available for generating updated partitions of the third subset a portion of said memory volume used for execution of the process block 308.

Figure 8:
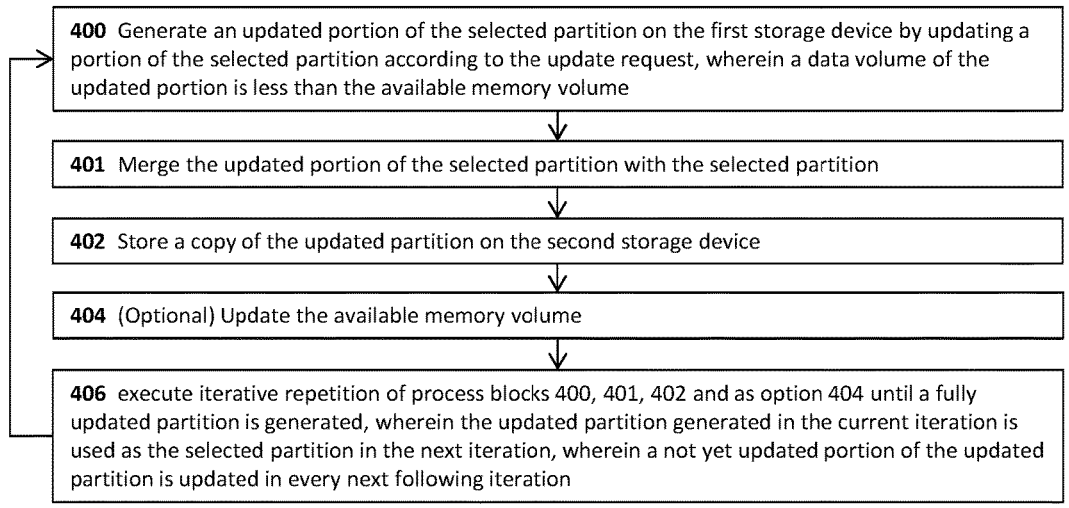
FIG. 8 is a flow chart of a method.

FIG. 8 illustrates a method of execution of process block 308. It begins with process block 400. In process block 400 an updated portion of the selected partition is generated on the first storage device according to the update request, e.g. update specifications in the update request. The selected partition is split in portions of equal data volumes. Alternatively, the selected partition is split in portions having the same numbers of data entities of the selected partition. The data entities can be rows of a table, when the selected partition is a table. As another alternative, the partition can be spilt in portions, wherein at least two portions have different data volume. Yet another option is interactive generation of the updated portion of the selected partition. The updated portion of the selected partition is generated gradually until a data volume of the generated updated portion exceeds a threshold value being less than the memory available for updating of the partitions, wherein in the process of the gradual generation of the updated portion of the selected partition a data volume of data comprised in an original form in the selected partition and in an updated form in the updated portion of the selected partition increases. The threshold value can be a predetermined percentage of the memory volume available for updating of the partitions (e.g. memory volume 210 on FIGS. 2-5). The predetermined percentage can be set to 80%, preferably 90%. Alternatively, the threshold value can be set to P1 value calculated according to equation [2].

In case of parallel updating of several partitions the threshold value can be the value calculated according to equation [2], wherein the value M is calculated according to equation [3]. Alternatively the threshold value can be a predetermined percentage of a portion of the memory value which is assigned to the process of updating the partition. The predetermined percentage can be set to 80%, preferably to 90%.

A number of portions in which the selected partition is split can be equal to a number of iterations, which determination can be performed using the aforementioned equation [1]. With independent whether the aforementioned equation is used or not, the selected partition is split in portions such that the generated updated partition of the selected partition is less than a memory volume available on the first storage device for the updating of the third subset of partitions. Details of the generation of the updated portion of the selected partition are discussed above.

Process block 401 is executed after process block 400. In process block 401 the updated portion of the selected partition is merged with the selected partition. It can be performed for instance by substituting the portion of the selected partition in the selected partition by its respective generated updated portion.

Process block 402 is executed after process block 401. In process block 402 the selected partition (i.e. its back-up copy) is stored on the second storage device.

Process block 404 is executed after process block 402. Process block 404 is an optional process block. In process block 404 the memory volume on the first storage device available for the generation of the updated partitions is updated. It can be changed as a result of changes in data volume of the selected partition after merge operation in process block 401. In addition, other processes can be started which execution can require memory of the first storage device.

Process block 406 is executed either after process block 402 or after process block 404, when the latter is executed. Process block 406 causes iterative execution of process blocks 400, 401, 402 and as option process block 404 until the selected partition is fully updated. The updated partition generated in the current iteration is used as the selected partition in the next iteration. A not yet updated portion of the selected partition is updated in every next following iteration. The number of the iterations can be determined according to the aforementioned equation [2].

An example of execution of method of FIG. 7 is illustrated on FIG. 5, wherein the first partition is updated in two iterations 230 and 231.

Figure 9:
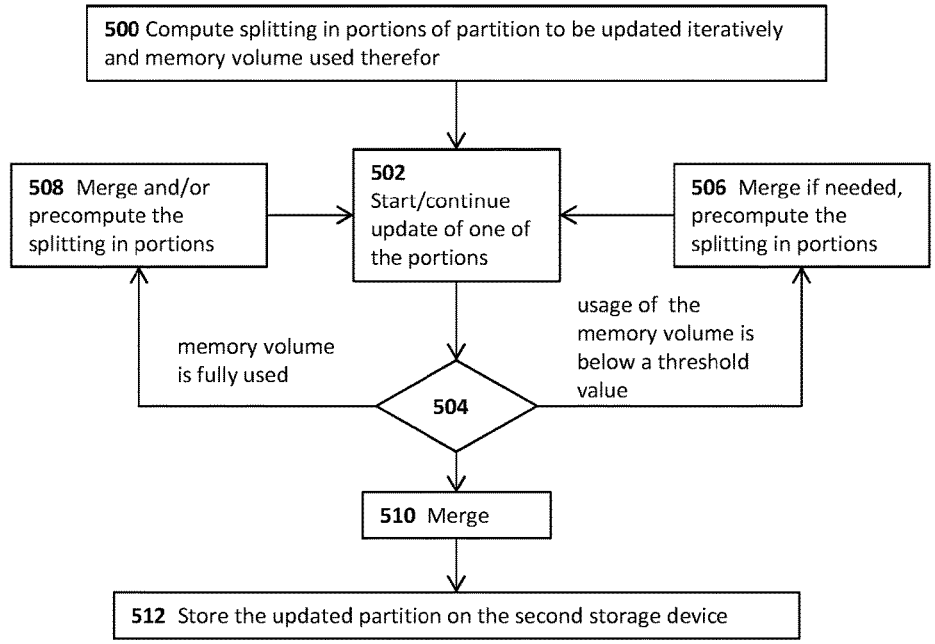
FIG. 9 is a flow chart of a method.

FIG. 9 illustrates an extended flow diagram of the method depicted on FIG. 8. The method depicted on FIG. 9 is based on adaptive changes of data volumes of portions of a partition to be updated. As a result thereof effective utilization of the memory volume on the first storage device to be used for the generation of the updated partition can be provided. Moreover the method depicted on FIG. 9 can provide for refining of coefficients k1, k2, k3 in the equations [1] and [2].

The method depicted on FIG. 9 begins with process block 500. In process block 500 portions of a partition to be updated are defined, wherein each of the portion can be updated in a respective iteration. In addition the values according to equations [1], [2], and if necessary according to equation [3] are calculated. In particular, the memory volume P1 to be used for updating of the partition is calculated.

Process block 502 is executed after process block 500. In process block 502 the updating of one of the portions generated in process block 500 is started.

Decision process block 504 is executed after starting of process block 502. Decision process 504 block causes execution of process block 508 in case when the updating of the portion of the partition is not completed and the memory volume to be used for the updating of the partition is fully used. Decision process block 504 causes execution of process block 506 when updating of the portion of the partition is completed and the memory volume to be used for the updating of the partition is used below a threshold value, e.g. less than 80% (preferably 90%) of the memory volume on the first storage device is used for the generated updated portion of the partition. In all other cases decision process block 504 causes execution of process block 510.

In process block 508 the generation of the updated portion of the partition is stopped. The generated updated portion corresponding to a portion of the respective portion of the partition can be merged with the partition. Afterwards a back-up copy of the updated partition can be stored on the second storage device. With independent of the execution of the merge operation and since the memory volume to be used for the generation of the updated portions of the partition appears to be too small, new portions of the partition (or the not yet updated portion of it in case when the partition is already merged with one or more updated portions of it) can be defined, each, to be updated in the respective iteration. One of the following criteria a)-c) can be applied for defining the new portions: a). at least one of the new portions has a smaller data volume than a data volume of the previously defined portion having the biggest data volume among the previously defined data portions; b) any of the new portions has a smaller data volume than an average data volume of the previously defined portions; c) at least one of the new portions has a smaller data volume than a data volume of the previously defined portion having the smallest data volume among the previously defined portions. In addition, one or more values of the coefficients k1, k2, k3 can be updated if the initial splitting appeared to be incorrect, for instance when the generation of the updated portion of the partition required more memory volume than it was predicted according to equation [2].

Process block 502 is executed after process block 508. In process block 502, when it is executed after process block 508, the updating of the partition is continued/restarted using the newly defined portions of the partition computed in process block 508.

In process block 506 the generated updated portion can be merged with the partition. In contrast to process block 508 the generated updated portion of the partition corresponds to the portion of the partition generated in process block 500. Afterwards a back-up copy of the updated partition can be stored on the second storage device. As alternative, the process of the generation of the updated portion of the partition started in process block 502 can be continued in process block 502 because the memory volume for the generation of the updated partition is underused. With independent of the execution of the merge operation and since the memory volume to be used for the generation of the updated portions of the partition appears to be too big, new portions of the partition (or the not yet updated portion of it in case when the partition is already merged with one or more updated portions of it) can be defined, each, to be updated in the respective iteration. One of the following criteria a)-c) can be applied for defining the new portions: a). at least one of the new portions has a bigger data volume than a data volume of the previously defined portion having the smallest data volume among the previously defined data portions; b) any of the new portions has a bigger data volume than an average data volume of the previously defined portions; c) at least one of the new portions has a bigger data volume than a data volume of the previously defined portion having the biggest data volume among the previously defined portions. In addition, one or more values of the coefficients k1, k2, k3 can be updated if the initial splitting appeared to be incorrect, for instance when the generation of the updated portion of the partition required less memory volume than it was predicted according to equation [2].

In process block 502, when it is executed after process block 508, the generation of the updated portion of the partition can be continued until the memory volume for the generation of the partition is used above the aforementioned threshold. With independent of the continuation of the generation of the updated portion of the partition, the updating of the partition is continued/restarted using the new splitting of the partition in portions generated in process block 508.

In process block 510 the generated updated portion of the partition is merged with the partition. Process block 512 is executed after process block 510. In process block 512 a back-up of the updated partition is stored on the second storage device. Execution of process block 502 and the respective subsequent process blocks are repeated for each of the portions of the partition.

Turning back to flow diagram depicted on FIG. 7, process block 310 is executed after process block 308. In process block 310 the updated selected partition is moved from the first storage device to the second storage device if in process block 304 is was uploaded to the first storage device.

Process block 312 is executed after process block 308. In process block 312 another partition is selected from the third subset of partitions if the third subset comprises at least one of the not yet selected partitions. The execution of process block 312 can be delayed until all processes, if any, of updating of other partitions of the third subset of partitions started in parallel with execution of process block 308 are completed. If the third subset of partitions comprises more than one of the not yet selected partitions, then the not yet selected partition having the highest data volume among the not yet selected partitions of the third subset of partitions can be selected in process block 312.

If the process block 312 is executed, then the aforementioned sequence of process blocks 304, 306, 308, and process block 310 as option are repeated. Execution of this sequence is illustrated on FIG. 6, wherein the second partition is updated in two iterations 232 and 233. Process block 312 can cause repetitive execution of the aforementioned sequence until all partitions of the third subset of partitions are updated. The third execution of the aforementioned sequence corresponds to updating of the third partition in two iterations 234 and 235.

Other partitions of the third subset partitions can be updated in parallel with execution of process block 308. Process block 314 can be executed in parallel with process block 314 if the third subset of the partitions comprises at least one not yet selected partition. In addition another criterion has to be complied with. The process of the updating of the partition has to be completed in a number of iterations being less than a predefined value divided by a data volume of said partition. Details of this criterion are discussed above. Compliance with this criterion provides for a limitation of data traffic between the first and the second storage devices. The number of iterations required for updating of the partition in parallel with the execution of process block 308 can be calculated according to the equation [1], wherein in the equation the available memory volume for updating of the partitions of the third subset has to be corrected according to the equation [3] because it is already partially used by at least one other process of updating of another partition. The evaluation of a portion of the available memory volume which can be used by other processes of updating of other partitions can be performed in the currently executed process block 308. The portion of memory volume available for updating of the partition in process block 314 can be calculated by subtracting from the memory volume available for updating of the partitions all of its portions used by currently running processes of updating of partitions. The value of a data volume of a partition to be updated in parallel with all currently running processes of updating of partitions has to be subtracted from the memory volume available for updating of the partitions of the third subset as well if the partition to be updated has to be uploaded from the second data storage to the first storage for executing of its update. In case when several partitions of the third subset comply with the aforementioned criteria, then the one having the biggest data volume among them can be selected.

Tuning back to the example on FIG. 6, the fourth partition is selected for being updated in parallel with updating of the third partition. The fourth partition can be updated in two iterations 236 and 237 using memory volume 212*d* comprised in memory volume 213*c* which is not used for updating of the third partition in iterations 234 and 235.

Process block 316 is executed after process block 316. In process block 316 the partition selected in process block 314 is uploaded to the first storage device if it is stored on only on the second storage device.

Process block 318 is executed after process block 316. In process block 318 the partition selected in process block 314 is updated in the same way as the respective partition in process block 308. In other words process blocks 318 and 308 use the same procedure for updating of partitions.

Execution of process block 314 can be repeated in parallel with execution of process block 318 in order to identify any other partitions which update can be started in parallel with currently running updates of other partitions.

Repetitive execution of process block 314 can be illustrated using the example depicted on FIG. 6. As it is mentioned above, the third partition is updated in process block 308 (iterations 234 and 235), while the fourth partition is updated in process block 318 (iterations 236 and 237). Process block 312 delays execution of a next loop starting with process block 304 because process block 318 in which the fourth partition is updated is still running when process block 308 is completed and the third partition is fully updated. The fifth partition is updated in process block 318 using one iteration 238, because during execution of process block 318 in which the fourth partition is updated a memory volume which can be used for updating of other not yet updated partitions (a sum or memory volumes marked as 213*e* and 213*d*) is increased because execution of process block 308 in which the third partition is updated is completed.

Process block 320 is executed after process block 316. In process block 320 the partition updated in process block 318 is moved from the first data storage to the second data storage if it was uploaded from the second data storage to the first data storage in process block 316.

Figure 10:
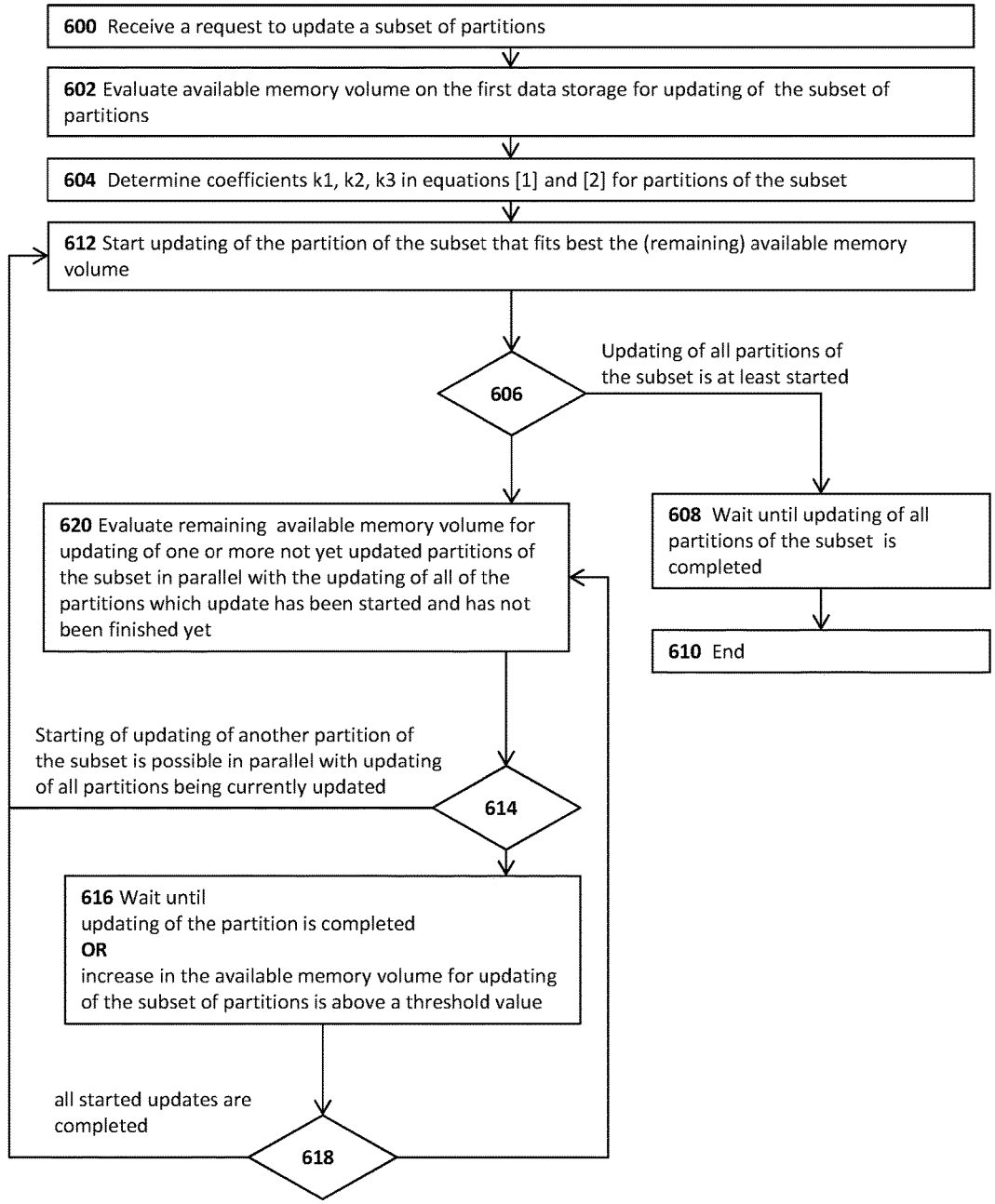
FIG. 10 is a flow chart of a method.

FIG. 10 is a flow diagram of the method depicted on FIG. 7, wherein the emphasis is made on time aspects of the method. The method begins with process block 600. In process block a request to update the third subset of partitions is received. This process block is essentially the same as process block 300 depicted on FIG. 7.

Process blocks 602 and 604 are executed after process block 600. They can be executed in any sequence or in parallel with each other. In process block 602 the available memory volume on the first storage device for updating of the thirst subset is evaluated. This process block is essentially the same as process block 306.

In process block 604 parameters determining memory management in the process of updating of the partitions are determined. For instance coefficients k1, k2, k3 can be determined using types of data stored in the partitions to be updated, characteristics of compression algorithms used for data compression, change in data volume/structure of the partitions derived from update instructions. These coefficients can be refined in the process of updating of the partitions. The refinement can be done using method depicted on FIG. 9.

Process block 612 is executed after execution of process blocks 602 and 604 is completed. Updating of one of the partitions of the third set is started. The partition selected for updating in process block 612 can be the one having the biggest data volume on the first storage device before update. Process block 612 can be executed using methods depicted on FIGS. 8 and 9.

Decision process block 606 is executed after process block 612. Decision process block 606 causes execution of process block 608 when updating of all partitions of the third subset is started, i.e. there are no other partitions to be updated. When this is not the case decision process block 606 causes execution of process block 620.

In process block 620 the remaining available memory for updating of one or more other partitions of the third set can be started in parallel with the process of updating of the partition which is started in process block 612.

In process block 612 the remaining available memory volume is evaluated. The remaining available memory volume is a portion of the memory volume evaluated in process block 602 which is not used by any of the currently running updating processes. The example remaining available memory volumes are 213a in time interval T0-T1, 213b in time interval T1-T2, 213d in time interval T2-T3, a sum of 213f and 213d in time interval T3-T4, and 213g in time interval T4-T5 on FIG. 6. Process block 612 can be comprised in process block 314 on FIG. 7.

Decision process block is executed after process block 620. Decision process block 614 causes execution of process block 612 in case when updating of another partition of the third subset in possible with all currently running processes of updating started in process block 612. Otherwise decision process block 614 causes execution of process block 616. The same criteria as formulated in process block 314 can be used for selecting a partition which update can be started in parallel with all currently running updates.

Monitoring of the available memory volume for updating of the partitions is performed in process block 616. Process block 616 causes execution of decision process block 618 only after a change in the available memory volume for updating of the third subset of partitions or after updating of the partition is completed. Process block 616 can be configured such that it causes execution of decision process block 618 only after changes in the available memory volume being above a threshold value. The threshold value can be 10% of the available memory volume, preferably 20% of the available memory volume.

Decision process block causes execution of process block 612 in case when all stared update processes are completed, otherwise it cases execution of process block 612.

Monitoring of not yet completed update processes is performed in process block 608. After completing of all update processes process block causes execution of process block 610 in which the updating of the partitions of the third set is completed.

The updating of partitions according to time diagram depicted on FIG. 6 can be executed using the following sequence of process blocks of the method depicted on FIG. 10: a) update process initialization 600, 602, 604; b) updating of the first partition 612; c) updating of the second partition 606, 620, 614, 616, 618, 612; d) updating of the third partition, 606, 620, 614, 616, 618, 612 d) updating of the fourth partition, 606, 620, 614, 616, 612; e) updating of the fifth partition 606, 620, 614, 616, 618, 612; f) finalizing the update process 608, 610.

What is claimed is:

1. A system comprising a first and a second storage device and a computing device, wherein a database is stored across a set of partitions comprising a first subset of partitions and a second subset of partitions, the first storage device stores the first subset of partitions, the second storage device stores the second subset of partitions, the computing device comprising a memory storing processor-executable program code and a computer processor to execute the processor-executable program code in order to cause the computing device to:
   receiving an update request to update a third subset of partitions of the set of partitions;
   selecting one of the partitions of the third subset of the partitions;
   writing the selected partition to the first storage device if the selected partition is stored only on the second storage device;
   evaluating available memory volume on the first storage device, the available memory volume being available for updating of the third subset of the partitions to be updated; and
   executing iterative update of the selected partition, the iterative update of the selected partition comprising:
      generating an updated portion of the selected partition on the first storage device by updating a portion of the selected partition according to the update request, wherein a data volume of the updated portion is less than the available memory volume,
      generating an updated partition on the first storage device by merging the updated portion of the selected partition with the selected partition, and
      writing a copy of the updated partition to the second storage device,
   wherein executing of the iterative update of the selected partition is continued until a fully updated partition is generated, wherein the updated partition generated in the current iteration is used as the selected partition in the next iteration, wherein a not yet updated portion of the selected partition is updated in every next following iteration.

2. The system of claim 1, wherein the portions of the selected partition in a process of the executing of the iterative update of the selected partition are selected such that a number of iterations in the process of the executing of the iterative update of the selected partition is minimized.

3. The system of claim 1, wherein at least one of the iterations in a process of the execution of the iterative update of the selected partition comprises:
   updating the available memory volume.

4. The system of claim 1, wherein in a process of the generating of the updated portion of the selected partition on the first storage device by updating the portion of the selected partition according to the update request the updated portion of the selected partition is generated gradually until the data volume of the updated portion exceeds a predefined percentage of the available memory volume, wherein in the process of the gradual generation of the updated portion of the selected partition a data volume of data comprised in an original form in the selected partition and in an updated form in the updated portion of the selected partition increases.

5. The system of claim 4, wherein the predefined percentage is determined such that that a number of iterations in the process of the executing of the iterative update of the selected partition is minimized.

6. The system of claim 1, wherein the selected partition has the biggest data volume among the partitions of the third subset of partitions.

7. The system of claim 1, wherein the generating of an updated partition on the first storage device by merging the updated portion of the selected partition with the selected partition comprises substituting a portion of the partition corresponding to the updated portion with the updated portion.

8. The system of claim 1, wherein the database is a column store database storing columns of stables stored in the database as contiguous data records, wherein the generating of the updated portion of the selected partition on the first storage device by updating a portion of the selected partition according to the update request comprises
generating, according to the update request, updated rows of one or more tables stored in the database.

9. The system of claim 1, wherein the execution of the processor-executable code by the computer processor further causes the computing device to:
selecting another partition of the third subset of the partitions if the third subset of partitions comprises at least one not yet selected partition and a process of the executing of the iterative update of the another partition can be started in parallel with a process of executing of the iterative update of the selected partition and be completed using a portion of the available memory volume in a number of iterations being less than a predefined positive number divided by a data volume used for storing of the another partition on either the first or the second storage device, wherein the portion of the available memory is equal to the available memory volume minus a sum of all summands of a set of summands, the set of summands comprising a data volume of the another selected partition if it is stored only on the second storage and a memory volume used for the executing of iterative update of the selected partition; and
performing the following if the another partition is selected:
writing the another selected partition to the first storage device if the another selected partition is stored only on the second storage device;
executing the iterative update of the another selected partition, wherein a data volume of the updated portion of the another selected partition in any of the iterations in a process of the executing of the iterative update of the another selected partition is less than the portion of the available memory volume; and
moving the fully updated another selected partition from the first storage device to the second storage device if the writing of the another selected partition to the first storage device from the second storage device is executed.

10. The system of claim 9, wherein the execution of the processor-executable code by the computer processor further causes the computing device to:
selecting yet another partition of the third subset of the partitions if the third subset of the partitions comprises at least one not yet selected partition after all other executions of iterative update of all previously selected partitions are completed, wherein the yet another partition has the biggest data volume among all of the not yet selected partitions of the third subset of the partitions; and
executing the iterative update of the yet another selected partition if the yet another partition is selected.

11. The system of claim 1, wherein a process of the executing of the iterative update of the selected partition is executed in a number of iterations being equal or less than a sum of two and an integer value of a ratio of a first and a second product, the first product being a product of all multiples of a set of multiples, the set of multiples comprising a data volume of the selected partition stored on the first storage device before the executing of the iterative update of the selected partition and a degree of data compression of the selected partition stored on the first storage device before the executing of the iterative update of the selected partition, the second product being a product of the evaluated memory volume and a degree of data compression of the updated portion of the selected partition.

12. The system of claim 11, the set of multiples comprising a data update factor being a ratio of a data volume of the fully updated selected partition stored on the first storage device and a data volume of the selected partition stored on the first storage device before the executing of the iterative update of the selected partition.

13. The system of claim 1, wherein the first storage device has a shorter access time than the second storage device.

14. The system of claim 1, wherein the system comprises dynamic random access memory, DRAM, wherein the first storage device comprises a portion of the DRAM and is configured to store the first subset of partitions in the portion of the DRAM.

15. The system of claim 1, wherein the execution of the processor-executable code by the computer processor further causes the computing device to:
selecting yet another partition of the third subset of the partitions if the third subset of the partitions comprises at least one not yet selected partition and all other executions of iterative update of all previously selected partitions are completed, wherein the yet another partition has the biggest data volume among all of the not yet selected partitions of the third subset of the partitions; and
executing the iterative update of the yet another selected partition if the yet another partition is selected.

16. The system of claim 1, wherein a data volume of the selected partition is excluded from the available memory volume if the writing of the selected partition to the first storage device is executed.

17. The system of claim 1, wherein the execution of the processor-executable code by the computer processor further causes the computing device to:
moving the fully updated partition from the first storage to the second storage if the writing of the selected partition to the first data storage is executed.

18. The system of claim 1, wherein a degree of data compression of the updated portion of the selected partition on the first storage device is less than a degree of data compression of the selected partition on the first storage device.

19. A computer-implemented method for updating a database stored across a set of partitions on a computer system, the computer system comprising a first and a second storage device and a computing device, the set of partitions comprising a first subset of partitions and a second subset of partitions, the first storage device storing the first subset of partitions, the second storage device storing the second subset of partitions, the computing device comprising a memory storing processor-executable program code and a computer processor to execute the processor-executable program code in order to cause the computing device to execute the computer-implemented method, the computer-implemented method comprising:

receiving an update request to update a third subset of partitions of the set of partitions;

selecting one of the partitions of the third subset of the partitions;

writing the selected partition to the first storage device if the selected partition is stored only on the second storage device;

evaluating available memory volume on the first storage device, the available memory volume being available for updating of the third subset of the partitions to be updated; and executing iterative update of the selected partition, the iterative update of the selected partition comprising:

generating an updated portion of the selected partition on the first storage device by updating a portion of the selected partition according to the update request, wherein a data volume of the updated portion is less than the available memory volume, generating an updated partition on the first storage device by merging the updated portion of the selected partition with the selected partition, and writing a copy of the updated partition to the second storage device, wherein executing of the iterative update of the selected partition is continued until a fully updated partition is generated, wherein the updated partition generated in the current iteration is used as the selected partition in the next iteration, wherein a not yet updated portion of the selected partition is updated in every next following iteration.

20. A non-transitory computer readable medium having stored thereon a computer executable code for execution by a microprocessor controlling an electronic system, wherein execution of the executable code causes the electronic system to execute a computer-implemented method of claim 19.

* * * * *